United States Patent
Martin (10) Patent No.: US 9,642,298 B1
(45) Date of Patent: May 9, 2017

(54) COMPACT FLOATING ROW CLEANER

(71) Applicant: Ronald S. Martin, Trenton, KY (US)

(72) Inventor: Ronald S. Martin, Trenton, KY (US)

( * ) Notice: Subject to any disclaimer, the term of this patent is extended or adjusted under 35 U.S.C. 154(b) by 0 days.

(21) Appl. No.: 14/105,702

(22) Filed: Dec. 13, 2013

Related U.S. Application Data (63) Continuation of application No. 12/427,677, filed on Apr. 21, 2009, now Pat. No. 8,631,879.

(60) Provisional application No. 61/124,962, filed on Apr. 21, 2008.

(51) Int. Cl.
*A01C 5/06* (2006.01)
*A01C 7/00* (2006.01)
*A01B 63/24* (2006.01)

(52) U.S. Cl.
CPC .............. *A01C 5/064* (2013.01); *A01C 7/006* (2013.01); *A01B 63/24* (2013.01)

(58) Field of Classification Search
CPC ................................ A01C 7/006; A01B 63/24
USPC ........................................................ 172/540
See application file for complete search history.

(56) References Cited

U.S. PATENT DOCUMENTS

| | | | |
|---|---|---|---|
| 3,306,371 A | 2/1967 | Bush | |
| 4,425,973 A | 1/1984 | Williams et al. | |
| 4,483,401 A | 11/1984 | Robertson | |
| 5,076,180 A | 12/1991 | Schneider | |
| 5,129,282 A | 7/1992 | Bassett et al. | |
| 5,255,617 A | 10/1993 | Williams et al. | |
| 5,341,754 A * | 8/1994 | Winterton | A01C 7/006 111/139 |
| 5,482,120 A | 1/1996 | Lloyd | |
| 5,588,382 A | 12/1996 | Embree et al. | |
| 5,640,914 A * | 6/1997 | Rawson | A01B 49/06 111/140 |
| 5,697,455 A * | 12/1997 | Deckler | A01C 7/006 172/624.5 |
| 5,704,430 A | 1/1998 | Smith et al. | |
| 5,970,892 A * | 10/1999 | Wendling | A01C 7/006 111/139 |
| 6,644,224 B1 * | 11/2003 | Bassett | A01B 49/06 111/139 |
| 7,240,627 B1 * | 7/2007 | Whalen | A01C 7/006 111/140 |
| D601,593 S | 10/2009 | Martin | |

* cited by examiner

*Primary Examiner* — Thomas B Will
*Assistant Examiner* — Joel F. Mitchell
(74) *Attorney, Agent, or Firm* — Hamilton IP Law, PC; Jay R. Hamilton; Charles A. Damschen (57) ABSTRACT

A floating row cleaner assembly comprising a tool arm row cleaner mount, a row cleaner frame mounting plate, a row cleaner frame pivotally attached to the tool arm row cleaner mount and the row cleaner frame mounting plate. The periphery of the u-shaped row cleaner frame is composed of a combination of angled and curved portions to reduce the length and width of the frame to allow row cleaners to be used in combination with a coulter, or other tillage tool, and planter row unit spacing below 30 inches, while allowing necessary clearance between the row cleaner(s) and the coulter for terrain responsive operation.

17 Claims, 13 Drawing Sheets

FIG. 13

COMPACT FLOATING ROW CLEANER

CROSS REFERENCE TO RELATED APPLICATIONS

This application is a continuation of and claims priority from U.S. patent application Ser. No. 12/427,677 filed on Apr. 21, 2009, which application claimed the filing benefit under 35 U.S.C. §119(e) of provisional U.S. Patent Application Ser. No. 61/124,962 filed on Apr. 21, 2008, all of which are incorporated by reference herein in their entireties.

FIELD OF THE INVENTION

The methods described herein are generally applicable to the field of agricultural equipment. The embodiments shown and described herein are more particularly for improved row cleaning for delivery of seed or fertilizer. Although in no way limiting, the present disclosure is particularly suited for minimum or no-till conditions.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

AUTHORIZATION PURSUANT TO 37 C.F.R. §1.171 (d)(c)

A portion of the disclosure of this patent document contains material which is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

U.S. Pat. No. 4,785,890 issued to Martin for "Ground-driven rotary row cleaner" illustrates prior art that may be relevant to the invention disclosed and claimed herein, but which fails to teach the improvement disclosed and claimed herein.

SUMMARY OF INVENTION

Applicant discloses and claims herein a row cleaner frame and structure, without limitations, which has particular application as an improved no-till or minimum tillage planting apparatus and or planting row unit. The present invention provides a mounting mechanism for planter row unit row cleaners. It includes an assembly for mounting the residue wheels in front of the row unit so that the row cleaner wheels are mounted in front of and to each side of a coulter, as in FIGS. 7-11. The row cleaner assembly itself is pivotally connected to the planter frame and one side of the support arm upon which the row unit coulter is mounted. The mounting of the row cleaner allows it to rise and fall about a horizontal axis, within a predetermined range, in response to either terrain elevation changes or contact with non-moveable obstructions such as rocks, large soil clods and root crowns.

A large of number of corn acres are planted with a row spacing of 30-38 inches. For various reasons, including increased yields, decreasing erosion and decreasing chemical costs, farmers are interested in reducing row spacing to less than 30 inches. Reductions to a row spacing of 15-20 inches is therefore desirable. The reduction in width between planted rows in combination with the use of row cleaners can lead to plugging of the planter row units i.e. the volume of trash flow is too high for the amount of actual physical space available between planter row units contiguously mounted on a tool bar. Furthermore, the reduced spacing between row units reduces the physical space available for mounting a row cleaner to a row unit. This problem is especially an issue for planters having a split row type, such as the 1700 Series John Deere front-fold planter. Applicant's design is of benefit and desirable. Additionally, many users wish to mount an accessory tool with the row cleaner, i.e. a coulter mounted in combination with a row cleaner for each row unit.

DETAILED DESCRIPTION

Brief Description of Drawings

In order that the advantages of the compact floating row cleaner will be readily understood, a more particular description of the compact floating row cleaner briefly described above will be rendered by reference to specific embodiments illustrated in the appended drawings. Understanding that these drawings depict only typical embodiments of the compact floating row cleaner and are not therefore to be considered limited of its scope, the compact floating row cleaner will be described and explained with additional specificity and detail through the use of the accompanying drawings.

| DETAILED DESCRIPTION - LISTING OF ELEMENTS | |
|---|---|
| Element Description | Element Number |
| Planter row unit | 1 |
| Front plate | 2 |
| Row unit disc opener | 3 |
| Planter depth tire | 4 |
| Coulter | 5 |
| Tool arm | 6 |
| Tool arm first end | 6a |
| Tool arm second end | 6b |
| Hub | 7 |
| Slotted aperture | 8 |
| Row cleaner assembly | 10 |
| Row cleaner frame | 11 |
| First side | 11a |
| First side tab | 11aa |
| Second side | 11b |
| Second side tab | 11bb |
| First side angled portion | 11c |
| Second side angled portion | 11d |
| Curved portion | 11e |
| Row cleaner wheel aperture | 11f |
| Row cleaner wheel | 12 |
| Tool arm row cleaner mount | 13 |
| Front plate portion | 13a |
| Row cleaner frame portion | 13b |
| Tool arm portion | 13c |
| Angled portion | 13d |
| Row cleaner frame mounting plate | 14 |
| Front plate member | 14a |
| Row cleaner frame member | 14b |
| Pivot | 16 |
| Nut | 17 |
| Bolt | 18 |
| Aperture | 19 |
| Washer | 21 |
| Depth adjustment | 22 |
| Depth adjustment dial | 23 |
| Interface rack | 24 |

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

DETAILED DESCRIPTION OF INVENTION

Figure 1:
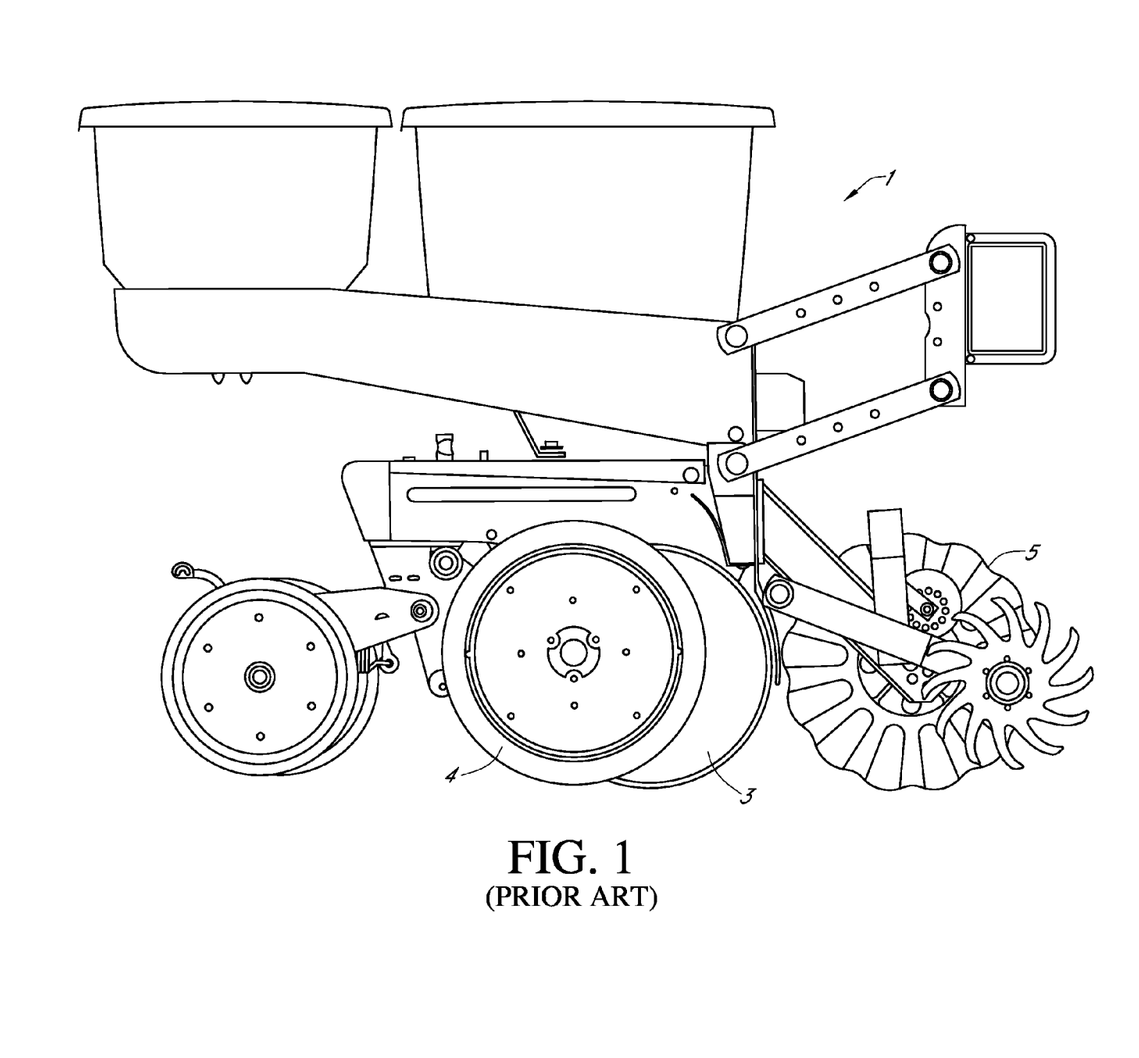
FIG. 1 illustrates a planter row unit mountable upon a tool bar as found in the prior art.
Figure 2:
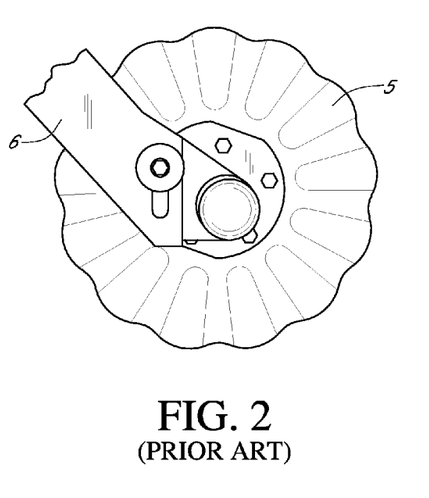
FIG. 2 provides a side view of a coulter and tool arm as found in the prior art.
Figure 3:
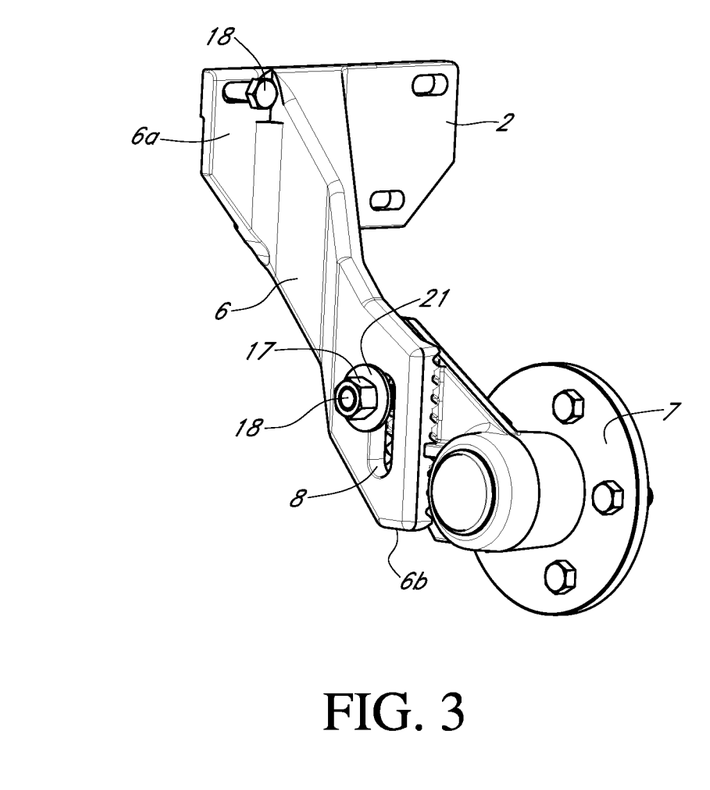
FIG. 3 provides a frontal perspective view of a tool arm mounted to a front plate as found in the prior art.

Referring now to the drawings, wherein like reference numerals designate identical or corresponding parts throughout the several views, FIGS. 1, 2, and 3 illustrate the prior art. FIG. 1 is a planter row unit 1, as is well known in the art and upon which the present art compact floating row cleaner unit may be mounted. FIG. 2 is a side view of a prior art coulter 5 and tool arm 5 over which the row cleaner assembly 10 may be mounted. FIG. 3 illustrates a view of the coulter 5 and tool arm 6 as shown in FIG. 1 with the planter row unit 1 removed for clarity.

The coulter 5 illustrated in FIGS. 2 and 3 uses a tool arm 6 to attach the coulter 5 in a relatively fixed, but adjustable position at the front of the planter row unit 1. For farmers desiring a planter for narrow row spacing, less than thirty inches and preferably as narrow as fifteen inches, single-arm, row unit mounted coulters 5, such as those shown in the various figures herein, are preferable. Double arm mounted coulters (not shown herein) are well known in the prior art but are of limited application for planter row units 1 configured for narrow row spacing. Furthermore, although applicant has illustrated the present art using a coulter 5, the present art is not limited as such. Other working tools or accessories may be mounted in place of the coulter 5 to work in combination with the planter row unit 1, as is well known to those skilled in the art.

As illustrated in FIG. 3, the tool arm 6 is affixed to the front plate 2 of the planter row unit 1 at the tool arm first end 6a by three bolts 18 passing through corresponding apertures 19 formed in the tool arm first end 6a and in the front plate 2 in conjunction with three nuts 17 and washers 21. A rotatable hub 7 is typically mounted at the tool arm second end 6b, which is opposite the front plate 2. A working tool, such as a coulter 5, may be mounted to the hub 7 such that the working tool may rotate with respect to the tool arm 6 and planter row unit 1. The working tool in FIG. 3 has been removed to better illustrate the tool arm 6.

As shown herein, the configuration of the tool arm 6 illustrated in FIGS. 3-8 is a two-piece design, with the tool arm first end 6a forming one piece and the tool arm second end 6b forming the second piece. The vertical position of the tool arm second end 6b may be adjusted with respect to the tool arm first end 6a, and consequently with respect to the planter row unit 1. The tool arm first end 6a and tool arm second end 6b interface one another at an interface rack 24 adjacent a slotted aperture 8 fashioned in a distal portion of the tool arm first end 6a. A bolt 18 passing through the slotted aperture 8 and a corresponding aperture 19 in the tool arm second end 6b, washer 21, and nut 17 fixes the position of the tool arm first end 6a with respect to the tool arm second end. This type of vertical adjustment between the tool arm second end 6b and tool arm first end 6a is well known to those skilled in the art and will not be described in further detail herein for purposes of clarity. The tool arm 6 extends from the front plate 2 so that the coulter 5 engages the ground prior to the planter row unit 1 during operation, which is most clearly shown in FIGS. 7-8. Other tools may be mounted to the hub 7 on the tool arm second end 6b, such as spiked wheels, compactions wheels, or any other tool known to those skilled in the art.

Figure 4:
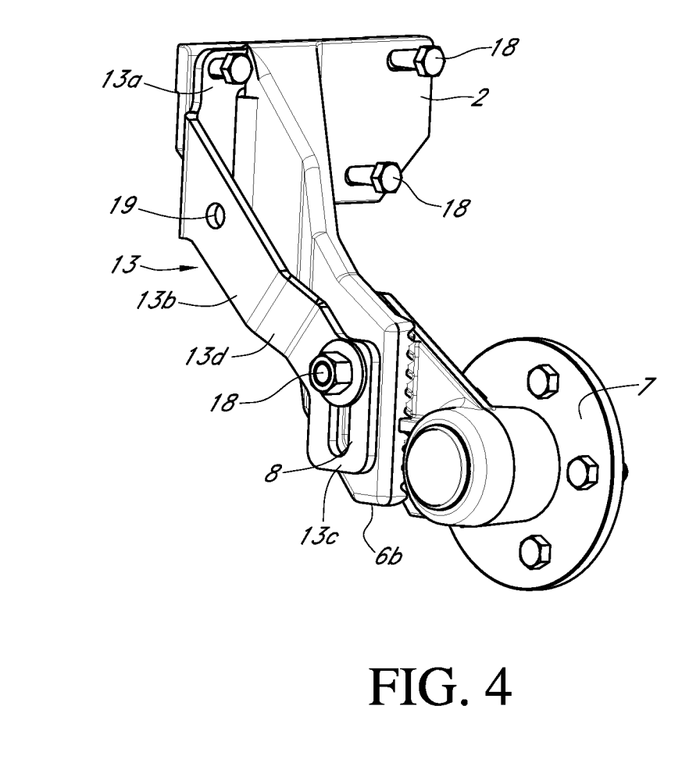
FIG. 4 provides a frontal perspective view of a tool arm with an exemplary embodiment of a tool arm row cleaner mount of the present art attached.

The exemplary embodiment of a tool arm row cleaner mount 13 (which is one component of the row cleaner mounting assembly) is shown affixed to the front plate 2 in FIG. 4. The tool arm row cleaner mount 13 of the exemplary embodiment is affixed to the front plate 2 via a nut 17, bolt 18, washer 21, and corresponding apertures 19 in the tool arm row cleaner mount 13 and the front plate 2. However, in other embodiments not pictured herein the tool arm row cleaner mount 13 is integrally formed with the front plate 2 or affixed to the front plate using other structures or methods than nuts 17, bolts 18, and washers 21. The nut 17 and bolt 18 used to mount the tool arm row cleaner mount 13 to the front plate 2 may simultaneously affix the tool arm 6 to the front plate 2, as is shown in FIG. 4.

The tool arm row cleaner mount 13 as shown in the exemplary embodiment includes a front plate portion 13a that is affixed to and abuts the front plate 2. A row cleaner frame portion 13b is integrally formed with the front plate portion 13a and oriented substantially perpendicularly thereto in the exemplary embodiment. The row cleaner frame portion 13b is adapted for pivotal engagement with a row cleaner frame 11, which engagement will be described in detail below. An angled portion 13d is integrally formed with the row cleaner frame portion 13b and angled with respect thereto. In the exemplary embodiment the angle between the row cleaner frame portion 13b and the angled portion 13d is approximately forty-five degrees, but may be greater or less in other embodiments not pictured herein. A tool arm portion 13c is integrally formed with the angled portion 13d and angled with respect thereto such that the tool arm portion 13c is substantially parallel to the row cleaner frame portion 13b in the exemplary embodiment of the tool arm row cleaner mount 13. The tool arm row cleaner mount 13 and various elements thereof may have different orientations/relationships depending on the planter row unit 1. In other embodiments, the tool arm row cleaner mount will only include a front plate portion 13a and row cleaner frame portion 13b.

Figure 5:
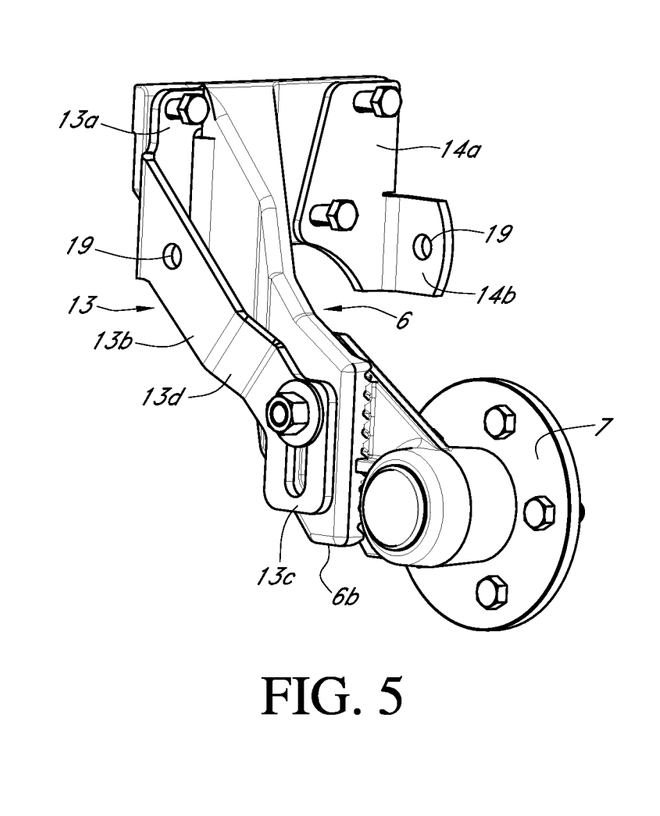
FIG. 5 provides a frontal perspective view of a tool arm with a tool arm row cleaner mount and row cleaner frame mounting plate of the present art attached.
Figure 6:
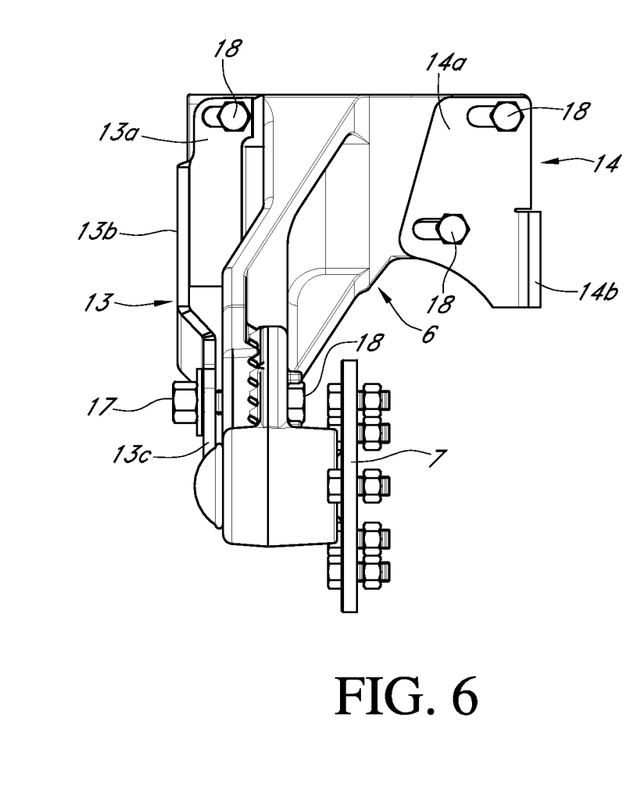
FIG. 6 provides a front view of FIG. 5.

As illustrated in FIG. 5, a row cleaner frame mounting plate 14 may be mounted to the front plate 2. The row cleaner frame mounting plate 14 of the exemplary embodiment is affixed to the front plate 2 via a plurality of nuts 17 and bolts 18 and corresponding apertures 19 in the tool arm row cleaner mount 13 and the front plate 2. However, as with the tool arm row cleaner mount 13, in other embodiments not pictured herein the row cleaner frame mounting plate 14 is integrally formed with the front plate 2 or affixed to the front plate using other structures or methods than nuts 17 and bolts 18. The nuts 17 and bolts 18 used to mount the row cleaner frame mounting plate 14 to the front plate 2 may simultaneously affix the tool arm 6 to the front plate 2, as is shown in FIG. 5.

The row cleaner frame mounting plate 14 as shown in the exemplary embodiment includes a front plate member 14a that is affixed to and abuts the front plate 2. A row cleaner frame member 14b is integrally formed with the front plate member 14a and oriented substantially perpendicularly thereto in the exemplary embodiment. The row cleaner frame member 14b is adapted for pivotal engagement with a row cleaner frame 11, which engagement will be described in detail below.

Figure 7:
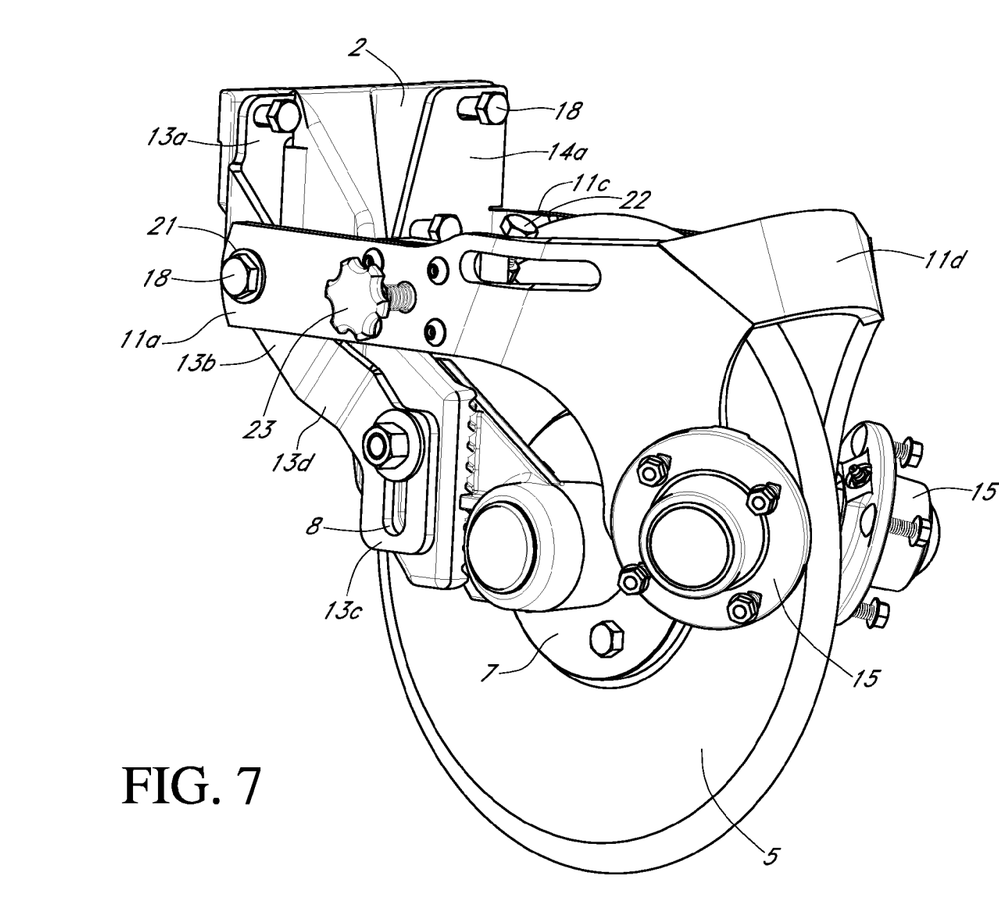
FIG. 7 provides a frontal perspective view of the apparatus shown in FIG. 5 with a row cleaner frame affixed thereto.
Figure 7A:
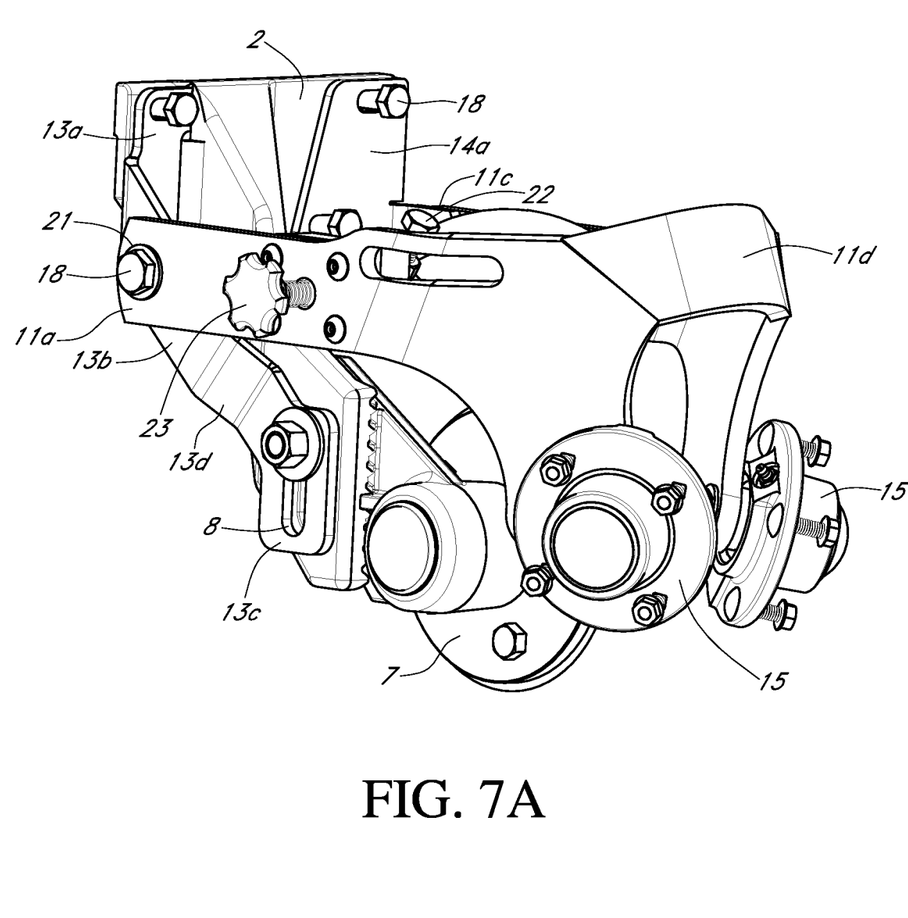
FIG. 7A provides a frontal perspective view of the apparatus shown in FIG. 7 with the coulter removed for purposes of clarity.
Figure 8:
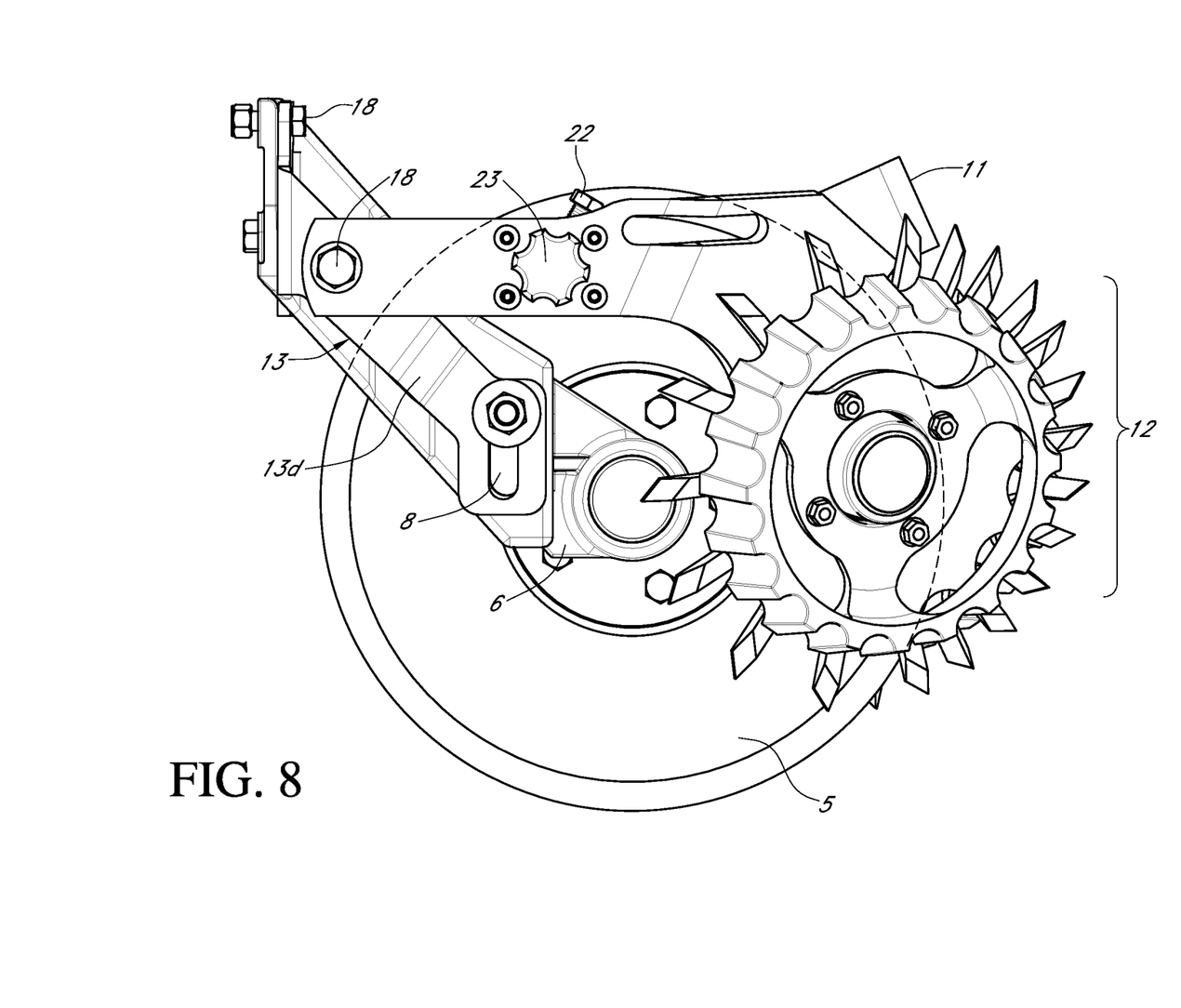
FIG. 8 provides a right side view illustrating one means of attaching applicant's row cleaner assembly to a front plate.
Figure 8A:
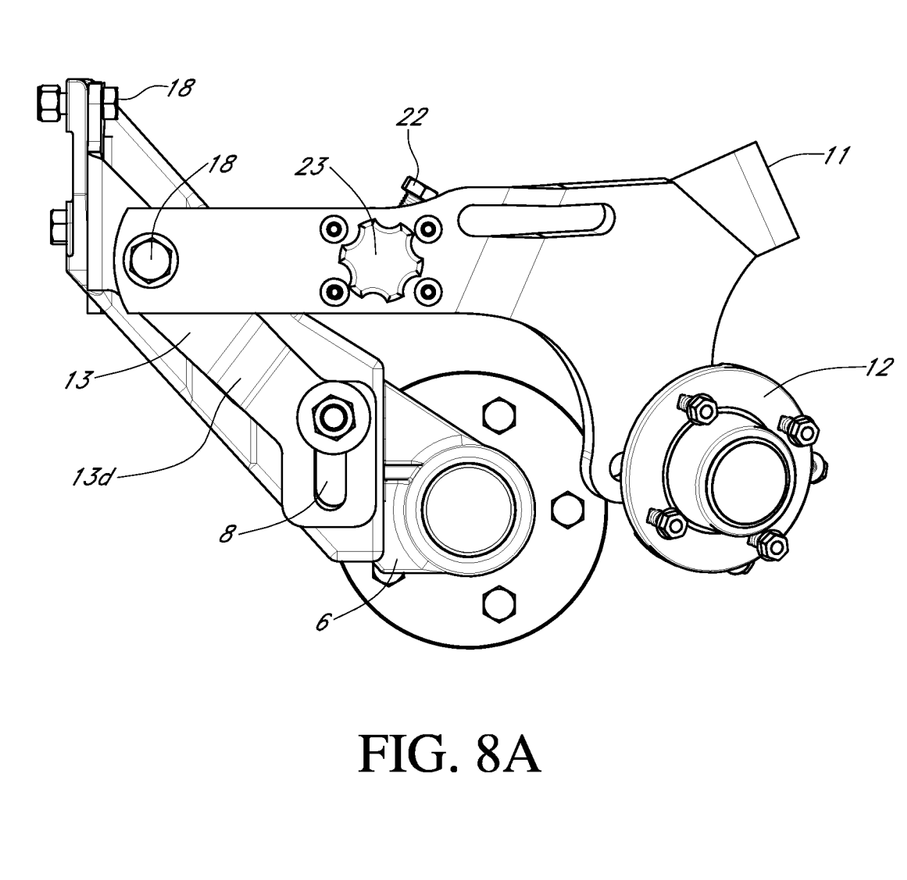
FIG. 8A provides a right side view of the apparatus from FIG. 8 with the coulter and the row cleaner wheels removed for purposes of clarity.

As shown in FIG. 7, a row cleaner frame, typically having either a generally U- or V-shape, may pivotally attach to the tool arm row cleaner mount 13 at the row cleaner frame portion and to the row cleaner frame mounting plate 14 at the row cleaner frame member 14b. In the exemplary embodiment, these pivotal attachments are achieved through an aperture 19 formed in the row cleaner frame portion 13b and another formed in the row cleaner frame member 14b that correspond to apertures 19 formed in the row cleaner frame 11. Nuts 17, bolts 18, and washers 21 are used to secure the row cleaner frame 11 to the tool arm row cleaner mount 13 and row cleaner frame mounting plate 14. However, in other embodiments not pictured herein, other structures and/or methods may be used to pivotally attach the row cleaner frame 11 to the tool arm row cleaner mount 13 and/or row cleaner frame mounting plate 14.

Figure 9:
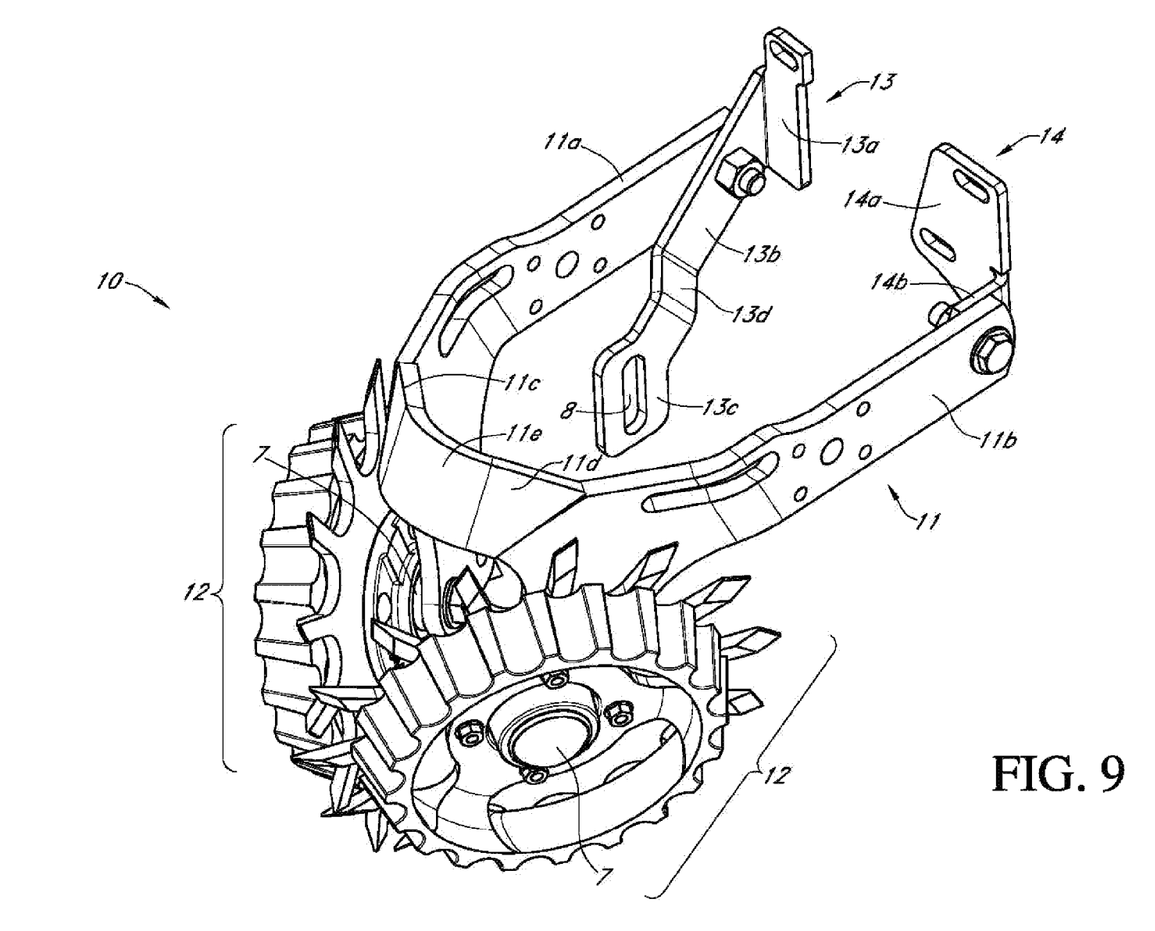
FIG. 9 provides a perspective view of the exemplary embodiment of a row cleaner assembly.
Figure 10:
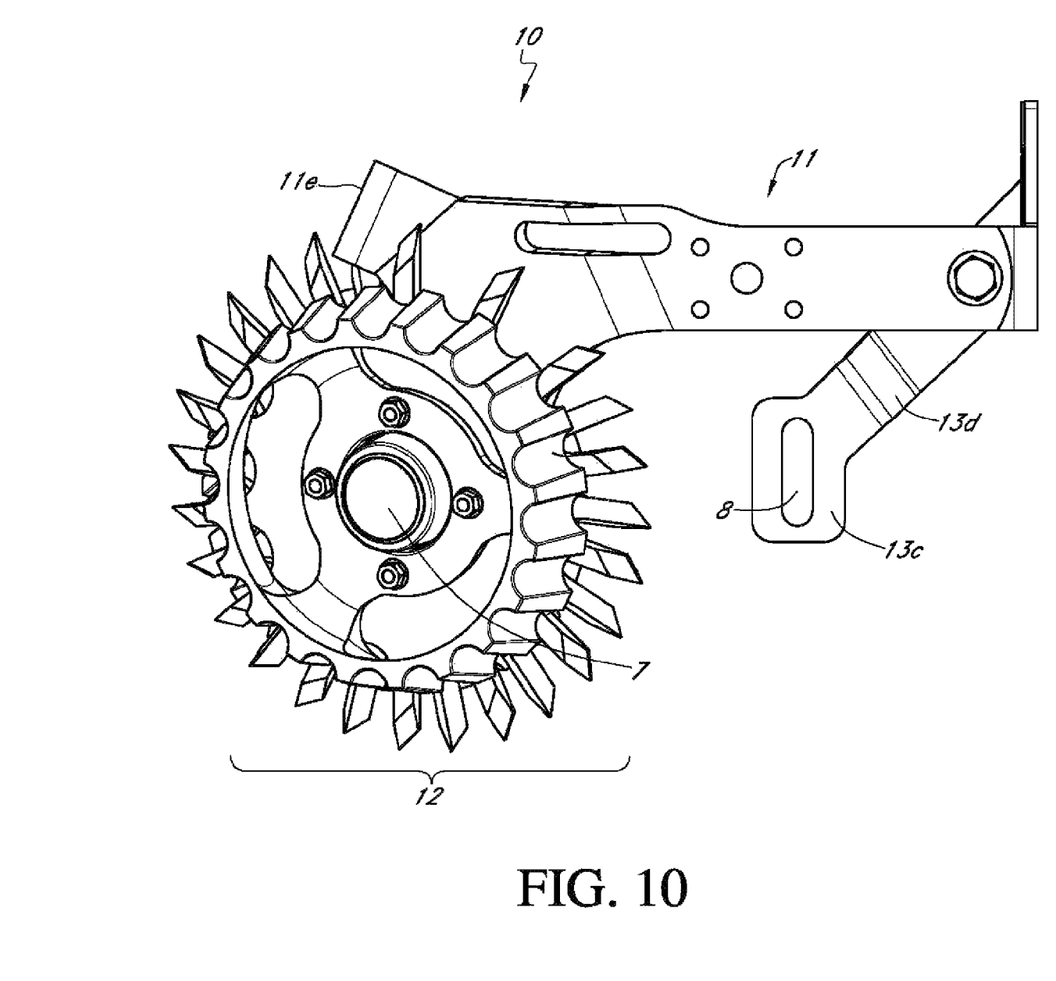
FIG. 10 provides a side view of the exemplary embodiment of a row cleaner assembly.
Figure 11:
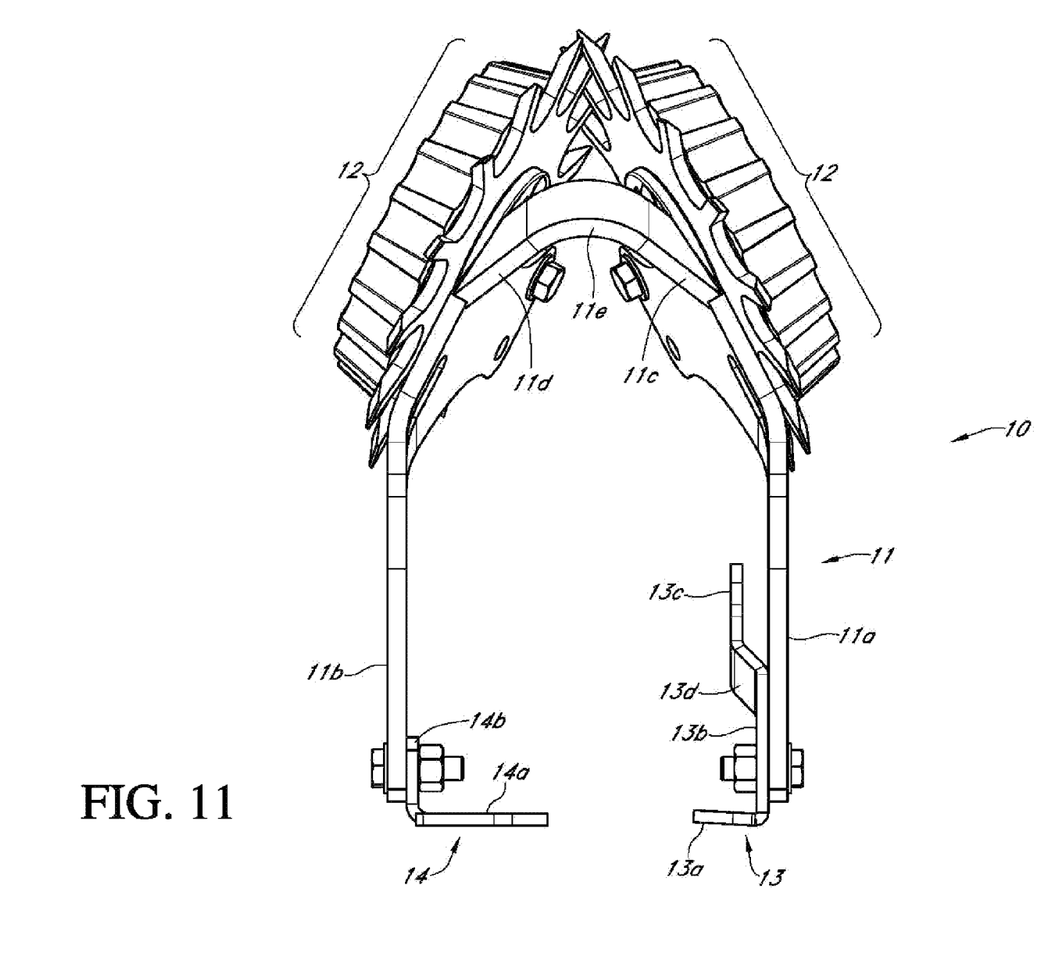
FIG. 11 provides a top view of the exemplary embodiment of a row cleaner assembly.

The row cleaner frame, which is shown in detail in FIGS. 9-11, is generally symmetrical with respect to a vertically oriented plane and extends from the front plate 2 in the same direction as the tool arm 6 (see FIG. 11). A first side 11a is pivotally attached to the tool arm row cleaner mount 13 and a second side 11b is pivotally attached to the row cleaner frame mounting plate 14. In the exemplary embodiment of the row cleaner assembly 10, the first and second sides 11a, 11b include sections that are substantially straight and sections that are angled, which are best shown in FIG. 11. The angle between the straight section and angled section of the first and second sides 11a, 11b will vary from one embodiment to the next, and in the exemplary embodiment is approximately twenty-five degrees. However, the precise angle in no way limits the scope of the row cleaner assembly 10.

Integrally formed with the first side 11a is a first side angled portion 11c, which is angled approximately twenty degrees with respect to the first side 11a. Integrally formed with the second side 11b is a second side angled portion 11d, which is angled approximately forty-five degrees with respect to the second side 11b. Affixed to and integrally formed with both the first and second side angled portions 11c, 11d is a curved portion 11e. In the exemplary embodiment, both the first and second sides 11a, 11b include hubs 7 pivotally mounted thereto to which row cleaner wheels 12 may be attached. The row cleaner frame 11 is configured such that it may be mounted over a coulter 5, wherein the coulter 5 and the row cleaner wheels 12 may simultaneously engage the ground surface (see FIGS. 7 and 8), and wherein the vertical position of the row cleaner frame 11 may change independently of the position of the tool arm 6.

The vertical position of the row cleaner frame 11 may be adjusted with respect to that of the tool arm 6 using an apparatus such as that described in U.S. Pat. No. 5,697,455, which is incorporated by reference herein in its entirety. Accordingly, the row cleaner frame 11 in the exemplary embodiment is free to move away from the ground surface independently of the tool arm 6 until the row cleaner frame 11 or some element affixed thereto, such as a row cleaner wheel 12, meets an obstruction. The depth adjustment 22 provides a limit as to the amount of travel for the row cleaner frame 11 toward the ground surface, and thereby determines the vertical relationship between the row cleaner frame 11 and the coulter 5. The depth adjustment 22 may be manipulated by the user via the depth adjustment dial 23. Accordingly, the row cleaner frame 11 as shown in the exemplary embodiment provides a floating row cleaner, the advantages of which are well known to those skilled in the art.

As those practiced in the arts will appreciate, row cleaner wheels 12 are one structure for use in cleaning rows for agricultural purposes. Those of ordinary skill in the art will appreciate that the present art reduces residue plugging during operation and allows relatively narrow spacing between each of the two row cleaner wheels 12 mounted to a row cleaner frame 11 as well as allowing relatively narrow spacing between adjacent planter row units 1. As developed by the Applicant, the present art, when applied to a planter, allows for as little as fifteen-inch spacing between adjacent rows of seeds, which is useful and desired. A benefit of this configuration and operation is that less residue is uncovered or moved from the row area. As a result, trash flow is reduced thereby reducing planter row unit 1 plugging, which is beneficial and desirable.

As illustrated in the various figures show herein, the row cleaner wheels 12 may be angled with respect to the vertical axis. The vertical angle as shown in the exemplary embodiment is twenty-three degrees on each side, which results in a total of forty-six degrees between the row cleaner wheels 12. The row cleaner frame 11 may be configured to result in other combined vertical angle configurations of the row cleaner wheels 12 in the range of zero to ninety degrees.

In the exemplary embodiment as pictured herein, each row cleaner wheel 12 of a pair is symmetrical to the other row cleaner wheel 12 in that pair. In another embodiment not pictured herein, the row cleaner wheels 12 are still asymmetrical. As shown, each row cleaner wheel 12 is comprised of two non-equal diameter portions, which allows the user to control the amount of trash cleared by each row cleaner wheel 12 and simultaneously maintain depth control of each row cleaner wheel 12. That is, the smaller diameter portion restricts the depth of penetration of the larger diameter portion of each row cleaner wheel 12.

Figure 12:
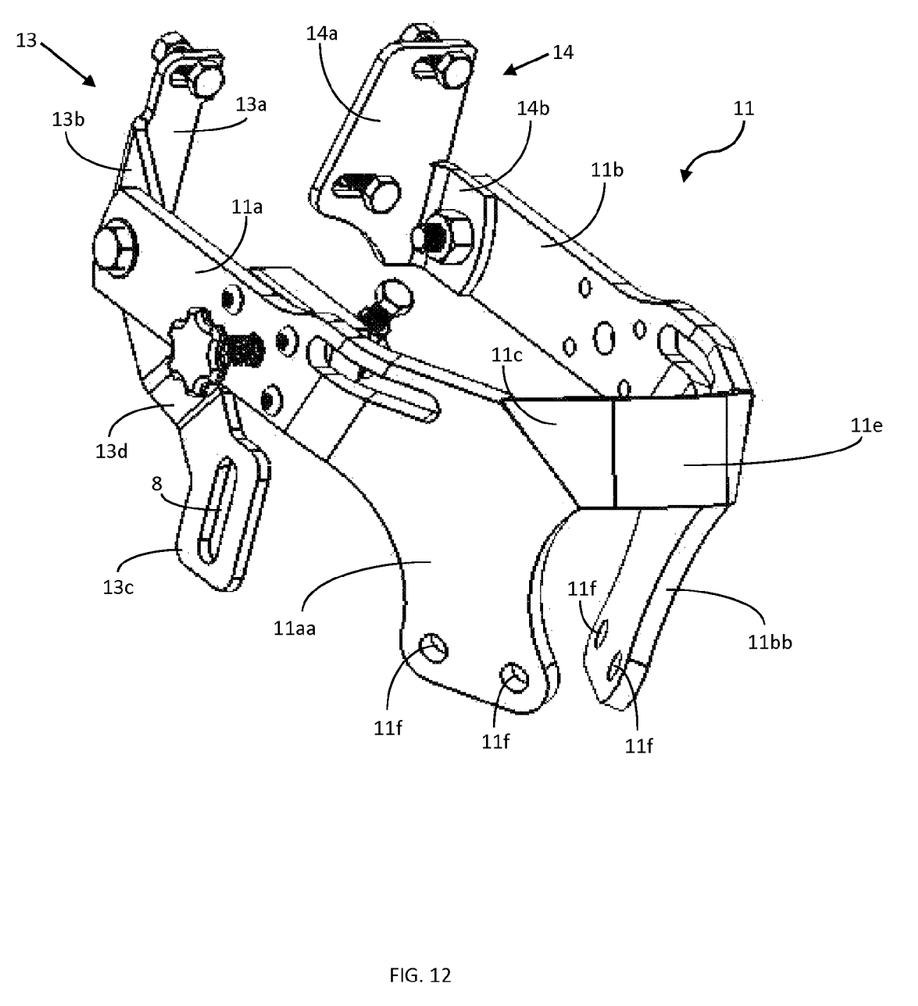
FIG. 12 provides a perspective view of one embodiment of the row cleaner frame with the coulter, row cleaner wheels, and various mounting structures removed for clarity.
Figure 13:
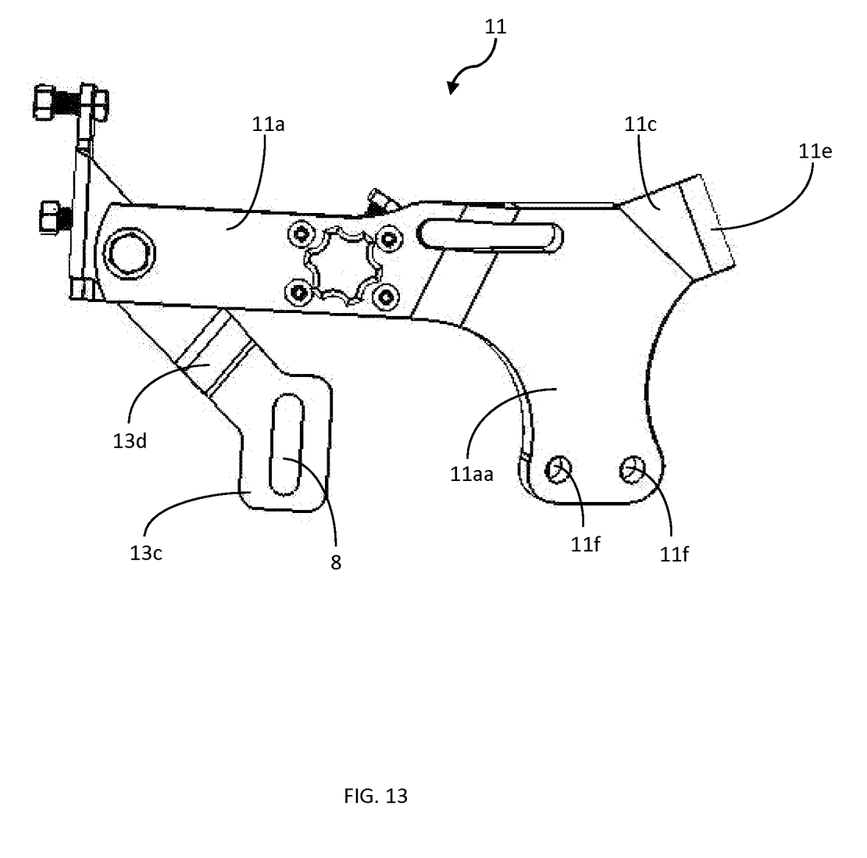
FIG. 13 provides a side view of one embodiment of the row cleaner frame with the coulter, row cleaner wheels, and various mounting structures removed for clarity.

As shown in FIGS. 12 and 13, the first side 11*a* may be formed with a first side tab 11*aa*, which extends below the first side 11*a*. The first side tab 11*aa* provides a lowered mounting point for the corresponding row cleaner wheel 12. The second side 11*b* may be formed with a similar second side tab 11*bb*. Either tab 11*aa*, 11*bb* may be formed with two row cleaner wheel apertures 11*f*. This allows the operator to position the row cleaner wheel 12 at two different positions on the row cleaner frame 11 so that the operator may select the optimal location based on specific conditions.

Providing a mounting point for the row cleaner wheel 12 that is below the first and second sides 11*a*, 11*b* of the row cleaner frame 11 allows the row cleaner assembly 10 to be more compact even when employed with additional structures, such as a coulter 5. Because the first and second side tabs 11*aa*, 11*bb* are lowered with respect to the other parts of the row cleaner frame 11, the row cleaner frame 11 may be placed in close proximity to an implement in the center of the row cleaner frame 11 while the row cleaner wheels 12 simultaneously are positioned in close proximity to the exterior sides of an implement in the center of the row cleaner frame 11. This situation is show in detail for a coulter 5 in FIG. 8. As shown, the tangential forward edge of the row cleaner assembly 10 (positioned toward the right in FIG. 8, and which is defined by the leading edge of the row cleaner wheels 12) is only marginally further forward than the tangential forward edge of the coulter 5. This compact dimension allows the row cleaner assembly 10 to be placed on a planter having multiple planter row units 1 even if the transport position for the planter requires that the row units be juxtaposed with one another about their respective length, such as the 1760 planter manufactured by Deere & Co.

As shown in FIG. 13, the axis of rotation for each row cleaner wheel 12 in the row cleaner assembly 10 is below the row cleaner frame 11. As explained in detail previously, this configuration allows the row cleaner frame 11 to be more compact in the horizontal dimension, even when used with an implement, such as a coulter 5.

As one of ordinary skill will appreciate, the row cleaner assembly 10 may be configured for use and operation adjacent a plurality of row cleaner assemblies 10 and/or attached to a tool bar to form a contiguous planter unit (not shown). To modify the amount of trash cleared from each row, the row cleaner wheels 12 may be angled or positioned so that the periphery of adjacent row cleaner wheels 12 in a pair thereof intersect one another during use and operation for increased trash clearing. In another embodiment the row cleaner wheels 12 may be positioned so that the periphery of adjacent row cleaner wheels 12 do not intersect one another for less trash clearing.

The row cleaner assembly 10 and various elements thereof may be constructed of any material known to those skilled in the art that is appropriate for the specific application thereof. For example, steel, metallic alloys, and any other material known to those skilled in the art may be used to construct the row cleaner assembly 10.

It should be noted that the present invention is not limited to the specific embodiments pictured and described herein, but is intended to apply to all similar methods for ground surface penetration during operation of planter, seeder or drill unit. Accordingly, modifications and alterations from the described embodiments will occur to those skilled in the art without departure from the spirit and scope of the present invention.

What is claimed is:
1. An apparatus comprising:
 a. a tool arm row cleaner mount comprising:
  i. a front plate portion adapted for engagement with a front plate;
  ii. a row cleaner frame portion oriented substantially perpendicular to said front plate portion, said row cleaner frame portion extending from said front plate portion, wherein said row cleaner frame portion is formed with an aperture therein to facilitate pivotal engagement with a row cleaner frame;
  iii. an angled portion affixed to and extending outward from said row cleaner frame portion, said angled portion angled between 3 and 90 degrees with respect to said row cleaner frame portion; and,
  iv. a tool arm portion affixed to and extending outward from said angled portion, said tool arm portion substantially parallel to said row cleaner frame portion, wherein said tool arm portion is adapted for engagement with a tool arm extending from said front plate, and wherein said aperture in said row cleaner frame portion is positioned between said front plate portion and said tool arm portion;
 b. a row cleaner frame mounting plate comprising:
  i. a front plate member adapted for engagement with said front plate, wherein said front plate member and said front plate portion are coplanar; and
  ii. a row cleaner frame member substantially perpendicular to said front plate member, said row cleaner frame member extending from said front plate member, and wherein an aperture is formed in said row cleaner member to facilitate pivotal engagement with said row cleaner frame;
 c. wherein said row cleaner frame comprises:
  i. a first side, wherein said first side is pivotally attached to said tool arm row cleaner mount;
  ii. a second side, wherein said second side is pivotally attached to said row cleaner frame mounting plate;
  iii. a first side angled portion, wherein said first side angled portion is connected to and angled with respect to said first side;
  iv. a second side angled portion, wherein said second side angled portion is connected to and angled with respect to said second side; and
  v. a curved portion, wherein said curved portion is connected to said second side angled portion and said first side angled portion.

2. The apparatus according to claim 1 wherein said tool arm row cleaner mount and said row cleaner frame mounting plate are affixed to said front plate via a plurality of bolts and nuts.

3. The apparatus according to claim 1 further comprising a tool engaged with a second end of said tool arm.

4. The apparatus according to claim 3 wherein said tool is further defined as a coulter.

5. The apparatus according to claim 4 further comprising a row cleaner wheel mounted to said row cleaner frame.

6. The apparatus according to claim 5 wherein said row cleaner wheel is further defined as being angled from vertical.

7. The apparatus according to claim 6 wherein said row cleaner wheel is further defined as being angled less than 23 degrees from vertical.

8. The apparatus according to claim 1 further comprising a pair of row cleaner wheels pivotally attached to said row cleaner frame, wherein said pair of row cleaner wheels are intersectedly arranged with respect to one another.

9. The apparatus according to claim 8 wherein said tool arm is further defined as being positioned between said pair of row cleaner wheels.

10. A row cleaner assembly comprising:
   a. a front plate configured to engage a tool arm with a planter row unit, wherein said tool arm extends outward from said front plate from a first end of said tool arm affixed to said front plate, wherein a hub is pivotally affixed to a second end of said tool arm;
   b. a tool arm row cleaner mount comprising:
      i. a front plate portion adapted for engagement with said front plate;
      ii. a row cleaner frame portion oriented substantially perpendicular to said front plate portion, said row cleaner frame portion extending from said front plate portion, wherein said row cleaner frame portion is formed with an aperture therein to facilitate pivotal engagement with a row cleaner frame;
      iii. an angled portion affixed to and extending outward from said row cleaner frame portion, said angled portion angled between 3 and 90 degrees with respect to said row cleaner frame portion; and,
      iv. a tool arm portion affixed to and extending outward from said angled portion, said tool arm portion substantially parallel to said row cleaner frame portion, wherein said tool arm portion is affixed to said tool arm adjacent said second end of said tool arm, and wherein said aperture in said row cleaner frame portion is positioned between said front plate portion and said tool arm portion;
   c. a row cleaner frame mounting plate comprising:
      i. a front plate member adapted for engagement with said front plate, wherein said front plate member and said front plate portion are coplanar; and
      ii. a row cleaner frame member substantially perpendicular to said front plate member, said row cleaner frame member extending from said front plate member, and wherein an aperture is formed in said row cleaner member to facilitate pivotal engagement with said row cleaner frame.

11. The row cleaner assembly according to claim 10 wherein said row cleaner frame is further defined as pivotally attached to said tool arm row cleaner mount and said row cleaner frame mounting plate, wherein said row cleaner frame is shaped to surround said tool arm.

12. The row cleaner assembly according to claim 11 wherein said row cleaner frame is further defined as comprising:
   a. a first side, wherein said first side is pivotally attached to said tool arm row cleaner mount;
   b. a second side, wherein said second side is pivotally attached to said row cleaner frame mounting plate;
   c. a first side angled portion, wherein said first side angled portion is connected to and angled with respect to said first side;
   d. a second side angled portion, wherein said second side angled portion is connected to and angled with respect to said second side; and
   e. a curved portion, wherein said curved portion is connected to said second side angled portion and said first side angled portion.

13. The row cleaner assembly according to claim 12 wherein said first side and said second side of said row cleaner frame are further defined as each including a straight section and an angled section, wherein said angled section of said first side is affixed to said first side angled portion, and wherein said angled section of said second side is affixed to said second side angled portion.

14. The row cleaner assembly according to claim 13 wherein said first side and said first side angled portion of said row cleaner frame are further defined such that the angle therebetween is between one and sixty-five degrees.

15. The row cleaner assembly according to claim 11 further comprising a row cleaner wheel engaged with said row cleaner frame.

16. The row cleaner assembly according to claim 11 further comprising a pair of row cleaner wheels engaged with said row cleaner frame, wherein said row cleaner wheels are intersectedly arranged with respect to one another.

17. The apparatus according to claim 16 wherein said tool arm is further defined as being positioned between said pair of row cleaner wheels.

* * * * *